May 17, 1938.  Z. E. FLICK ET AL  2,117,472
BEARING PACKING
Filed Jan. 18, 1936
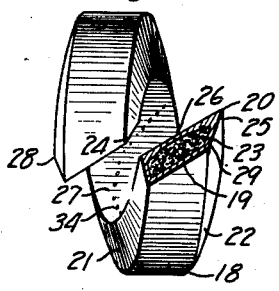
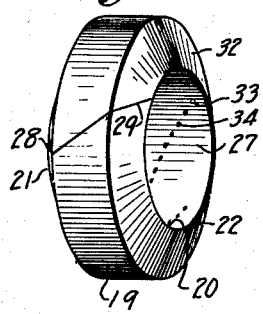
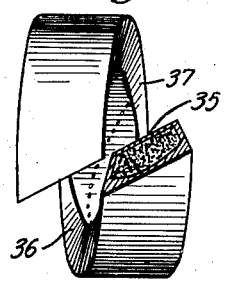
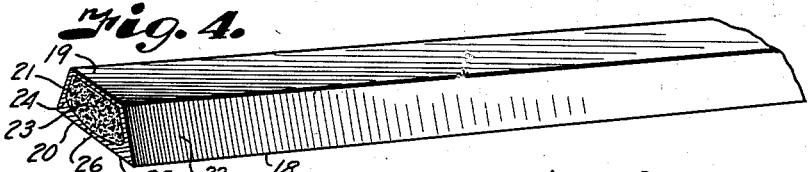
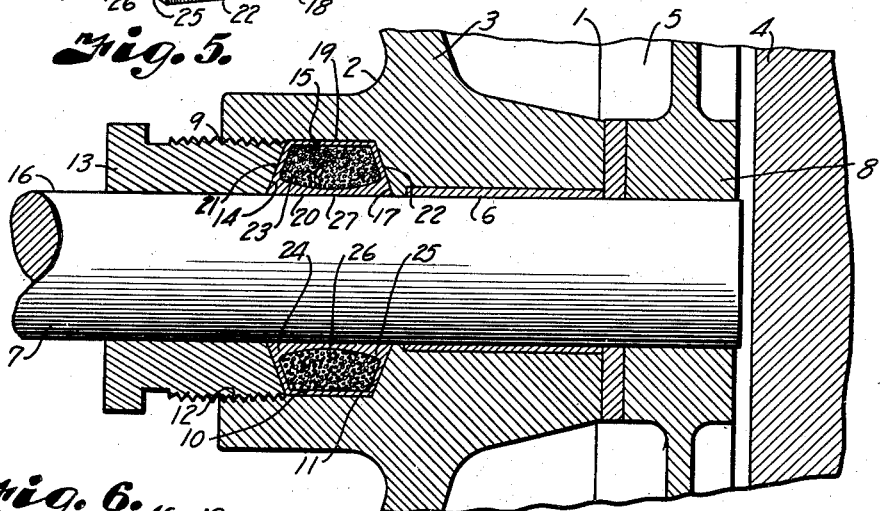
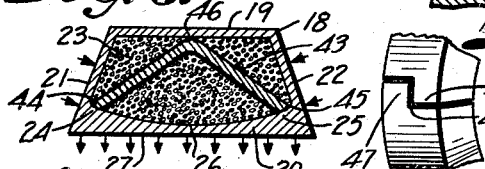
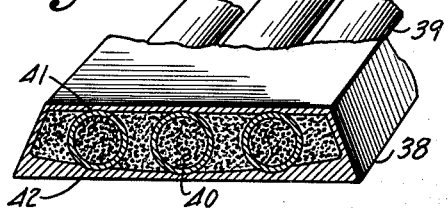
INVENTORS
Zeno E. Flick,
Jacob R. Price, and
Lester G. Seacat.
BY
ATTORNEY Patented May 17, 1938

2,117,472

UNITED STATES PATENT OFFICE 2,117,472

BEARING PACKING

Zeno E. Flick, Jackson, Mich., and Jacob R. Price and Lester G. Seacat, Kansas City, Mo.

Application January 18, 1936, Serial No. 59,704

3 Claims. (Cl. 154—45.5)

This invention relates to a bearing packing and particularly to one of preformed character which consists of a metal or composition sheath enclosing a core preferably impregnated with a lubricant. It is the present practice to form packings of this character by extruding metal in tubular form about a flexible strand to form a strip. This strip is then coiled in helical shape and compressed to the contour and size of the stuffing box in which it is to be used. Because of the fact that it is necessary for the packing to retain its compressed shape, the metal must be of extremely soft and formable character, therefore when shaped it is compressed beyond its elastic limit. If harder metals are employed the resultant shape is not such that the metal is compressed beyond its elastic limit with the result that the coils spring apart necessitating extreme pressure on the adjusting nut to bring them together otherwise the packing will leak between the coils. Another difficulty is that when the packing is inserted in a stuffing box and tightened in position, the soft metal is extruded from the stuffing box to escape around the shaft and to clog the channels through which lubricant is supplied to the shaft. The soft metal is also subject to rapid wear, and requires constant retightening of the gland, which adjustment has been limited from the start due to the preliminary compression of the coils incidental to the preforming operation. A further disadvantage is that in the preforming operation or adjustment of a packing in a bearing, the ends of the packing are subject to a greater degree of compression than the center portions so that it is impossible to obtain uniform contact of the packing with a shaft across the entire length of the wearing surface.

It is, therefore, the principal object of the present invention to provide a preformed bearing packing that consists of a sheath having substantially the same cross sectional shape as that of the bearing chamber in which it is to be used, thereby eliminating compression prior to its insertion therein.

Other important objects of the present invention are to provide a bearing packing capable of being formed of metal or composition material having the desired degree of hardness; to provide a bearing packing construction wherein adjustment pressure is applied to the shaft uniformly of the length of the bearing packing; to provide a preformed bearing packing having internal reinforcement to support the outer and inner circumferential walls in sealing contact with the corresponding surfaces of the packing chamber; to provide a bearing packing having a great lubricant capacity and resiliency, and to provide a bearing packing requiring fewer adjustments during the life thereof.

In accomplishing these and other objects of the invention, we have provided improved details of structure, the preferred forms of which are illustrated in the accompanying drawing wherein:

Fig. 1 is a perspective view of a combination packing and bearing element embodying the features of the present invention.

Fig. 2 is a similar view after the ends of the packing element are brought into alignment.

Fig. 3 is a perspective view of a modified form of packing ring to be used between packing elements shown in Fig. 1 in case of extremely long stuffing boxes.

Fig. 4 is a perspective section of a preformed strip from which the packing element shown in Figs. 1 and 2 is constructed.

Fig. 5 is a section through a conventional type of stuffing box illustrating application of our improved bearing and packing element.

Fig. 6 is a diagrammatic section illustrating application of the forces so as to effect sealing pressure uniformly along the length of the stuffing box.

Fig. 7 is a sectional view of a composite packing formed of the packing elements shown in Figs. 1 and 3.

Fig. 8 is a further modified form of the invention.

Fig. 9 is a detail fragmentary view showing a packing ring having a modified form of lap joint.

Referring more in detail to the drawing:

For better understanding of our invention we have illustrated its application in connection with a pump 1 of the type used in circulating the cooling water to and from an internal combustion engine, and which includes a housing 2 having side walls 3 and 4 forming an impeller chamber 5 therebetween. Rotatably mounted in a bearing 6 in the side wall 3 is a shaft 7, having its inner end projecting into the impeller chamber for mounting a rotor 8. In order to seal the pump housing against leakage around the shaft 7, the wall 3 carries a conventional stuffing box 9, having a cylindrical bore 10 of larger diameter than the shaft, and terminating in an inclined annular seat 11 located in spaced relation with the bearing 6. The outer end of the bore is threaded as at 12, to mount a packing nut 13, having a seat 14 inclined oppositely to the seat 11 to cooperate therewith, with the inner cylindrical face 15 of the wall 9, and with the peripheral face 16 of the shaft 7 to form an annular packing chamber 17 of trapezoidal cross section.

The seats or end walls of the chamber 17 are shaped so that they effect movement of the packing element in sealing contact with the shaft upon tightening of the nut 13.

The construction thus far described, or its equivalent, is conventional to any stuffing box and specifically forms no part of the present invention, however our improved bearing packing is preformed so that it preferably fills the packing chamber, as now to be described.

As above pointed out, the present invention contemplates a bearing packing formed from a strip 18 that has been preferably extruded in tubular form and having substantially the same trapezoidal cross section as the packing chamber, as shown in Fig. 2, to provide an outer wall 19, having substantially the same width as the corresponding dimension of the outer cylindrical face 15 of the packing chamber, and a parallel wall 20 at its opposite side having the same width as the contacting portion of the shaft 7.

The side walls 21 and 22 of the strip are formed on substantially the same angle as the sides of the packing chamber, and due to extrusion are integrally connected with the parallel walls 19 and 20 to form a seamless tubular strip. The tubular strip forms a sheathing for a resilient filler 23, and which is preferably impregnated with a suitable lubricant. The filler 23 is in such bulk that it substantially fills the tubular sheath when in relaxed condition but not sufficiently to pack the sheath so as to prevent its ready formation into a cylindrical ring, as illustrated in Fig. 1.

The side walls 21 and 22 are substantially the same thickness as the wall 19, however the wall 20 is formed so that the ends 24 and 25 thereof, which join with the walls 21 and 22, are of substantially greater thickness and taper to a relatively thinner central portion 26, so that when the bearing packing is placed in the bearing the forces imparted by the adjusting nut will effect uniform contact thereof with the shaft. The inner face 27 of the wall 20 is therefore shaped to effect distribution of the compression forces uniformly across the width thereof, as shown by the arrows in Fig. 4.

After production of the strip 18, it is formed in a helix having an inner diameter substantially equal to the shaft 7 and the individual coils are cut preferably on diagonal lines as indicated at 28 and 29. The ends of the individual sections are then brought into abutting alignment to form rings 32, as shown in Fig. 2, having inner and outer diameters, which will slide snugly over the shaft 7, and into the bore 9 without distortion. If desired, the inner face 33 may be provided with openings 34 through which lubricant contained in the strands may seep onto the shaft for lubricating purposes in preventing friction.

In packing chambers where the packing must be of greater width a packing ring, shown in Fig. 3, is interposed between pairs of rings of the type shown in Fig. 1.

The packing ring 35, shown in Fig. 3, is formed from a strip identical to that shown in Fig. 4, but when formed into a helix the wider width of the packing is coiled on the inside. Thus the annular side faces 36 and 37 of the packing ring 35 conform to the abutting annular side faces of the ring 32 when they are placed in juxtaposition, as shown in Fig. 7.

In wide stuffing boxes where a single packing ring is desired it may be provided of cellular construction wherein the outer and inner walls thereof are braced from each other to prevent inward buckling when the packing is tightened about the shaft. To accomplish this, the outer sheath 38, shaped to the cross section of the packing chamber, may contain one or more strands or supports 39. If the supports are tubular as shown, they may contain cores 40 formed of compressible material, as clearly shown in Fig. 8. In construction, the outer sheath is formed about the supports 39 so that the contact points 41 and 42 are slightly imbedded in the inner walls of the sheath, to prevent lateral movement thereof relatively to the sheath.

With our improved construction, the sheathing may be constructed of a metal or composition material having the degree of hardness necessary to give it the proper wearing qualities and prevent extrusion of the material around the shaft when adjustments are necessary.

In using the packing, a ring of desired size is inserted into the bore of the packing chamber so that the end wall 22 engages against the inclined seat of the packing chamber. The packing nut is then sleeved over the shaft and threaded into the bore so that the inclined seat 14 thereon engages the wall 21 at the opposite end of the packing. Then upon tightening of the packing nut the inclined seats 11 and 14 effect a downward and inward pressure on the wall 20 to force it into sealing contact with the shaft. Due to the graduated thickness of the material in the portion 20, the resistance offered thereby is such that the sealing pressure is distributed uniformly along the length of the packing to effect a positive seal and provide uniform wear on the shaft. The shape of the wall also prevents buckling of the packing into the space occupied by the impregnated filler. As the sealing face of the bearing packing wears, the adjusting nut may be retightened from time to time to keep the packing in sealing contact with the shaft.

In case of deeper packing chambers, rings of the type shown in Fig. 3 may be interposed between rings of the type shown in Fig. 1 to build up a bearing packing of the required width, or a ring formed of the bearing packing shown in Fig. 8 may be used.

If desired a V-shaped support 43 may be placed within the sheath as shown in Fig. 6, having edges 44 and 45 bearing within the corners thereof and a ridge 46 against the wall 19 so that when the adjusting pressure is applied the ridge or point of support 46 will push up against the outer wall.

In Fig. 9 the ends 47 and 48 of the ring are shown shaped to provide a stepped joint 49, otherwise it may be of the same construction as those illustrated in the other figures of the drawing.

From the foregoing it is obvious that we have provided a bearing packing which is easily constructed, and preformed to the shape of the bearing without compression of the packing strip and that when the preformed packing is inserted in the packing chamber the packing is in relaxed condition so that the first compression imparted thereto is that exerted by the adjusting nut itself. We are, therefore, enabled to provide a packing having a much greater degree of resiliency and having a longer wearing face, to prevent scoring of the shaft. The bearing packing is also capable of many adjustments before it is necessary to replace it. The bearing packing is capable of containing a large quantity of lubricant, absorbs vibration and requires few adjustments during the life thereof.

What we claim and desire to secure by Letters Patent is:

1. A packing including a tubular strip having integrally connected walls forming a sheath of trapezoidal cross-section to provide inclined end walls connected by parallel walls, the longer of said parallel walls being of increasing thickness from its center toward its juncture with the inclined end walls, a support in the sheath bearing against the juncture points of the thicker portions of said longer wall with the adjacent inclined end walls, and a lubricant impregnated material contained in the space defined by said walls and surrounding said support.

2. A packing including a tubular strip having integrally connected walls forming a sheath of trapezoidal cross-section providing inclined end walls connected by parallel walls, the longer of said parallel walls being of increasing thickness from its center toward its juncture with the inclined end walls, a substantially V-shaped support in the sheath having edges bearing against the juncture points of the thicker portions of said longer wall with the adjacent inclined end walls and a ridge supporting the center of the shorter parallel wall, and a lubricant impregnated material contained in the space defined by said walls and surrounding said support.

3. A packing including a tubular strip having integrally connected walls forming a sheath of trapezoidal cross-section to provide inclined end walls connected by parallel walls, the longer of said parallel walls being of increasing thickness from its center toward its juncture with the inclined end walls, a support in the sheath for spacing the parallel walls, and a lubricant impregnated material contained in the space defined by said walls and surrounding said support.

ZENO E. FLICK.
JACOB R. PRICE.
LESTER G. SEACAT.